United States Patent [19]

Yamano et al.

[11] Patent Number: 4,734,848
[45] Date of Patent: Mar. 29, 1988

[54] COMBINATION REDUCTION PROCESSING METHOD AND APPARATUS

[75] Inventors: Koichi Yamano, Tama; Akihiko Takano, Yokohama, both of Japan

[73] Assignee: Hitachi, Ltd., Tokyo, Japan

[21] Appl. No.: 754,967

[22] Filed: Jul. 15, 1985

[30] Foreign Application Priority Data

Jul. 17, 1984 [JP] Japan .................................. 59-146820
Aug. 29, 1984 [JP] Japan .................................. 59-178317

[51] Int. Cl.$^4$ .............................................. G06F 15/20
[52] U.S. Cl. ..................................... 364/200; 364/300
[58] Field of Search ... 364/200 MS File, 900 MS File, 364/300

[56] References Cited

U.S. PATENT DOCUMENTS

| 4,447,875 | 5/1984 | Bolton et al. | 364/200 |
| 4,502,118 | 2/1985 | Hagenmaier, Jr. et al. | 364/200 |
| 4,514,807 | 4/1985 | Nogi | 364/200 |
| 4,615,003 | 9/1986 | Logsdon et al. | 364/200 |
| 4,644,464 | 2/1987 | Logsdon et al. | 364/200 |
| 4,654,780 | 3/1987 | Logsdon et al. | 364/200 |

Primary Examiner—Raulfe B. Zache
Attorney, Agent, or Firm—Antonelli, Terry & Wands

[57] ABSTRACT

A calculation processing system characterized by decomposing a program into tuples, functions and variables, including abstracting the decomposed program thereby to transform it into a combinator graph, assigning the program in the combinator graph to a plurality of process units, and executing the assigned program through reductions.

19 Claims, 40 Drawing Figures

| COMBINATOR INSTRUCTION | FUNCTION KIND | RETURN ADDRESS | LINK ADDRESS | ARGUMENT ADDRESS |

81

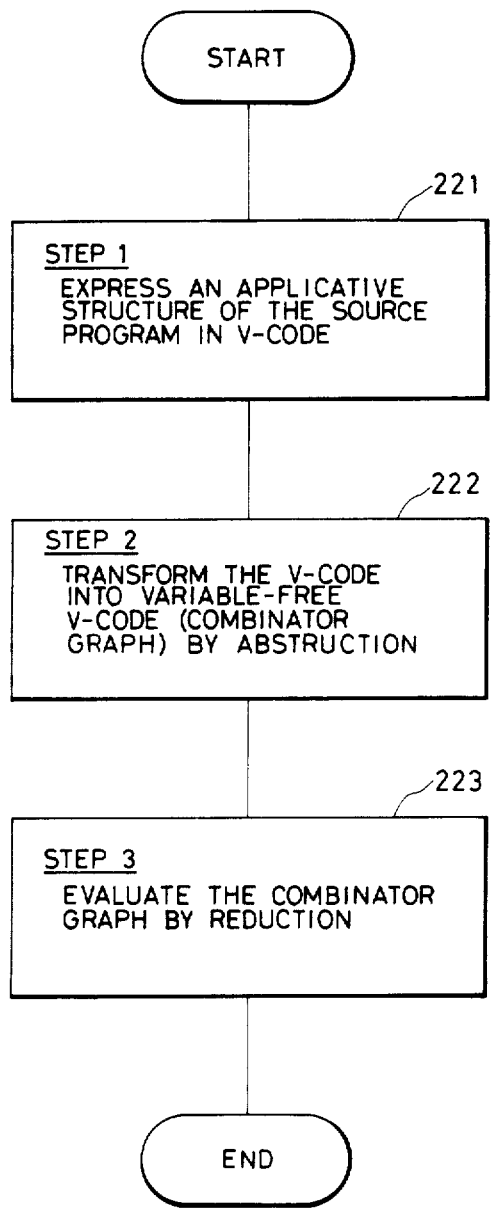

COMBINATION REDUCTION PROCESSING METHOD AND APPARATUS

BACKGROUND OF THE INVENTION

1. Field of the Invention

The present invention relates to a processing method and processing apparatus for functional languages etc., and, more particularly, to a computation processing method and apparatus constructed of a plurality of element processing functions according to which reduction computations for realizing the evaluation of a normal order, etc. attended with lazy evaluations are executed efficiently in parallel.

2. Description of the Prior Art

Heretofore, as the fundamental models of computations, one conforming to the principle of the Turing machine and one based on Church's λ-calculus have been well known. Computers based on the principle of the Turing machine type are also called the 'von Neumann type', and hold the mainstream of present-day computer architectures. On the other hand, the process of the computation based on the λ-calculus is also called the 'reduction type'. Since, in general, programming languages founded on this calculus do not involve side effects, they are termed 'functional or applicative languages', a typical one of which is Lisp.

In the λ-calculus, the λ-notation is employed in order to clearly distinguish variables for the definition of a function and the value of the function. In, for example, an equation $x+y$, the definition of a function whose variable is x is expressed as $\lambda x \cdot x + y$, and the definition of a function whose variables are both x and y is expressed as $\lambda x \cdot \lambda y \cdot x + y$. The operation of obtaining the function $\lambda x \rightleftarrows E(x, y)$ by placing λx before the equation E(x, y) in this manner is called the λ-abstraction, and x is called a bounded variable when the variable x is included in the λ terms. In case of applying 2 to x and 3 to y in the following equation, the computative process in the λ-calculus is executed through transforms:

$$((\lambda x \cdot \lambda y \cdot x + y) (2)) (3)$$
$$\rightarrow (\lambda y \cdot 2 + y) (3)$$
$$\rightarrow 2 + 3 \rightarrow 5$$

This computative process is called the reduction.

In the λ-calculus, such reductions are repeatedly executed until an equation at which no more reduction is possible, namely, a normal form is reached. Regarding equations which can reach the normal form, an order in which the reductions are performed from the leftmost and outermost equation is called the normal order, and an order in which the reductions are performed contrariwise from the leftmost and innermost equation is called the applicative order. It is known that some of computative equations which stop in the normal order do not stop in the applicative order.

As a processing system for various functional or applicative programming languages based on the λ-calculus, there has been proposed the Turner system which utilizes combinatory logics.

D. A. Turner: A New Implementation Technique for Applicative Languages; Software—Practice and Experience, vol 9, No 1, pp 31–49, 1979

Other known examples closest to the present invention are:

Official Gazettes of Japanese Laid-Open Patent Application Nos. 58-8358 and 58-8359.

Combinators were discovered by Schonfinkel and Curry in about 1930, and the combinators S, K, I, B, C and W are given by the following equations. Here, f and g denote functions each having one argument, and x and y variables.

$$Sfgx = fx(gx)$$

$$Kxy = x$$

$$Ix = x$$

$$Bfgx = f(gx)$$

$$Cfgx = (fx)g$$

$$Wfx = (fx)x$$

It is known that, among these combinators, the relations of I≡SKK, B≡S (KS) K, C≡S (BBS) (KK) and W≡SS (SK) hold.

The Turner system subjects a program described in functional forms, to the abstraction of eliminating variables by the use of combinators, so as to transform the program into the binary graph expression of the combinators, and regards the graph as machine instructions, which are construed and executed. Assuming that [x] be written instead of λx in the abstraction with the combinators, the following holds:

$$[x] \, x = I$$

$$[x] \, P = KP \, (x \not\in P)$$

$$[x] \, (PQ) = S([x]P) \, ([x] \, Q)$$

where I, K and S denote the combinators, and P and Q the functional equations.

In the Turner system, a multi-argument function f is transformed into a higher order function f' of one argument. This transform is called currying, which is defined as follows:

$$f(x_1, x_2, \ldots, x_n) \xrightarrow{\text{Currying}} ((\ldots (f'(x_1)x_2) \ldots x_n) =$$

$$f'(x_1)(x_2) \ldots (x_n)$$

As an example of the abstraction, SUC $(x) = 1 + x$ is:

$$SUC \rightarrow [x] \text{ (plus 1 } x0$$
$$\rightarrow S([x] \text{ (plus 1)})([x]x)$$
$$\rightarrow S(S(K \text{ plus})(K1))I$$

The resulting binary graph is shown in FIG. 12. This graph corresponds to machine instructions in an ordinary computer, and actual computations are performed by reductions indicated below.

$$SUC \, 3$$
$$\rightarrow S(S(K \text{ plus})(K1))I3$$
$$\rightarrow (S(K \text{ plus})(k1))3I3$$
$$\rightarrow (K \text{ plus})3(K1)3 \, 3$$
$$\rightarrow \text{plus 1 3}$$
$$\rightarrow 4$$

It is stated by Turner that the system can be realized with a stack mechanism by storing graphs in a computer.

The Turner system is characterized in that a function having a plurality of arguments is curried and transformed into a higher order function of one argument. Therefore, a combinator graph obtained by abstraction becomes redundant, and the number of steps in the process of reductions for evaluation increases. Another disadvantage is that, even when the arguments can be processed in parallel, they are processed one by one, so the parallel processing is difficult. Moreover, since the abstraction of removing variables from a program results in performing the abstraction of each variable over the entire program, the efficiency of compile is not favorable.

SUMMARY OF THE INVENTION

A first object of the present invention is to provide a data processing method and apparatus which are capable of realizing parallel reduction computations in, for example, the normal order attended with lazy evaluations, and so forth, as an efficient processing method and processing apparatus for solving the problem that the efficient execution of principally functional or applicative programming languages has been difficult with the architectures of conventional computers.

A second object of the present invention is to provide a data processing method and apparatus in which, in order to cope with the problems mentioned above, combinator graphs with product structures introduced in and an evaluation system based on reductions thereof are employed for functional or applicative programming languages, thereby to realize the concise expression and efficient run of a program.

BRIEF DESCRIPTION OF THE DRAWINGS

FIG. 13 is an explanatory diagram showing an example in which FIG. 12 is depicted using the tuples;

FIG. 17 is a flow chart of program processes according to the present invention;

DETAILED DESCRIPTION OF THE PREFERRED EMBODIMENTS

[First Embodiment]

Figure 1:
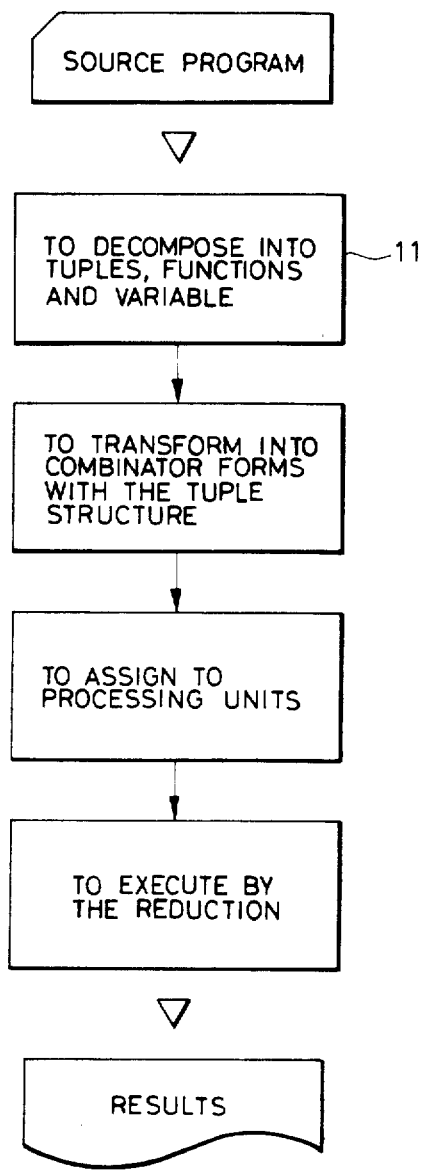
FIG. 1 is a flow chart showing the steps of a process in a first embodiment of the present invention.

The principle of a first embodiment will be described.

The system of the present invention for processing functional or applicative programming languages uses combinators likewise to the Turner system, but it is realized without currying a function which has a plurality of arguments. A tuple structure which allows the arrayal of arguments is introduced into a combinator expression as follows.

Letting the tuple of a formula $x_1, x_2, \ldots, x_n$ be denoted by $<x_1, x_2, \ldots, x_n>$ (also called the T combinator), a function having n arguments can be expressed as f: $<x_1, x_2, \ldots, x_n>$. That is, the basic principle of the present invention consists in that any multi-argument function having a plurality of arguments is handled as a function of one argument which is applicative to the arguments of the tuple.

Further, this can be applied to the tuple of functions $f_1, f_2, \ldots, f_n$.

$$<f_1, f_2, \ldots, f_n > : <x_1, x_2, \ldots, x_n>$$
$$= <f_1: <x_1, x_2, \ldots, x_n >,$$
$$f_2: <x_1, x_2, \ldots, x_n >,$$
$$\vdots$$
$$f_n: <x_1, x_2, \ldots, x_n >>$$

Now, combinators need to be defined for the tuple $\bar{x} = <x_1, x_2, \ldots, x_n>$, and the combinators K, S, I, C, B and W mentioned before can be used as they are when the tuple is regarded as one variable. A combinator $J_i$ for selecting any element from the tuple is defined anew as follows:

$$J_i \bar{x}$$

$$= J_i < x_1, x_2, \ldots, x_n >$$

$$= x_i (1 \leq i \leq n)$$

Abstractions become as follows:

$$[\bar{x}] (E_1 \ E_2) = S([\bar{x}]E_1) ([\bar{x}]E_2)$$

$$[\bar{x}] \bar{x} = I$$

$$[\bar{x}] y = Ky \ (xi \neq y \text{ for } i \text{ meeting } 1 \leq i \leq n)$$

$$[\bar{x}] xi = Ji(1 \leq i \leq n)$$

$$[\bar{x}] < y_1, y_2, \ldots, y_m >$$

$$= <[x]y_1, [x]y_2, \ldots, [x] y_m >$$

A graph which is obtained through such abstractions employing tuples shall be called the V-graph.

The following V-graph (FIG. 13) is obtained for Suc (x)=1+x mentioned before.

$$Suc \rightarrow [\bar{x}] \text{ plus } <1, x>$$
$$\rightarrow B \text{ plus } <K_1, J_1>$$

Next, the superiority of the present system employing tuples will be explained over the Turner system.

As an example, func f (x, y: integer): integer= =(x+1)* (y−1) end f will be taken.

This function curried is put:

mul (add x 1) (sub y 1)   (1)

The combinator expression for (1) becomes:

S(S(KS)(S(KK)(S(K mul)S(S(K add)I(K 1)))))
(K(S(S(K sub)I)(K 1)))

Further, when the combinators B and C are applied, the expression becomes:

S(BS(BK(B mul(C add 1))))(K(C sub 1))

When the two variables x and y are included as in this example, they are abstracted in the order of y and x, and hence, two times of text traverse are required in principle. Besides, the length of the combinator expression to be obtained becomes the order of n² in the worst case, n denoting the length of a source program.

When tuples are used, the result of the aforementioned example (1) becomes:

$$S(K \text{ mul})(S(K \text{ add } <J_1, K \ 1 > )(S(K(\text{sub} < J_2, K \ 1 >))  \quad (2)$$

$$= B \text{ mul } <B \text{ add } <J_1, K \ 1 >,$$

$$B \text{ sub } <J_2, K \ 1 >>$$

and the abstractions are possible with one time of text traverse in principle.

The combinator expression based on the Turner system is given by a binary tree called the Turner graph. It is known that calculations can be carried forward by evaluating the Turner graph successively in the normal order by the use of a reduction stack.

The present invention proposes a parallel evaluation system in the normal order based on the V-code expression founded on the tuples.

Figure 14:
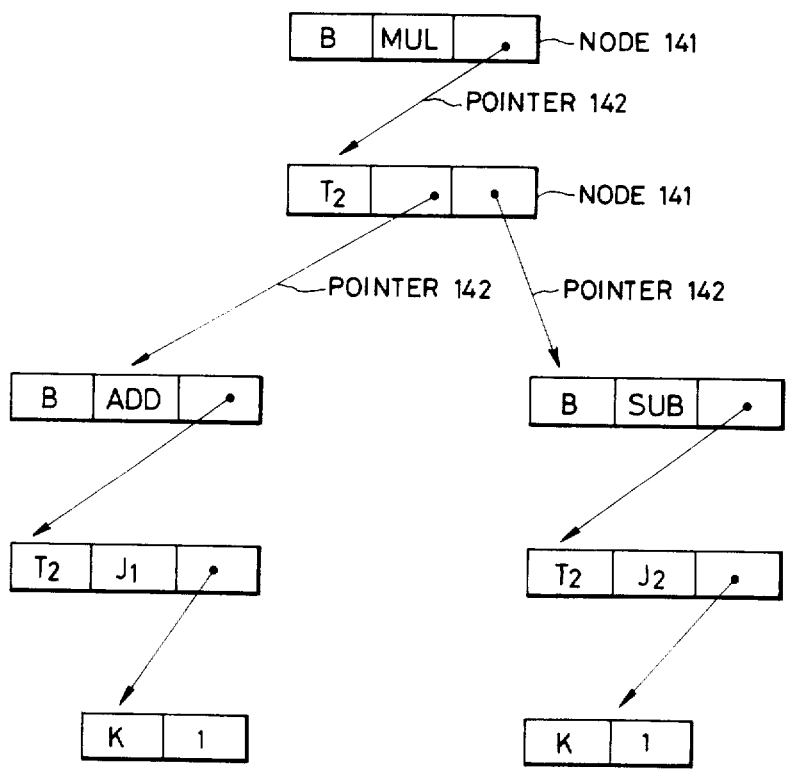
FIG. 14 is an explanatory diagram showing an example which uses the tuples in the present invention.

The graphical expression in V-codes, of the function f mentioned at (2) becomes as shown in FIG. 14. Assuming that . . . f: <3, 4>. . . be applied to the function f, the reduction course at this time becomes:

$$B \text{ mul} 1 < B \text{ add } <J_1, K1>,$$
$$B \text{ sub } <J_2, K1>><3, 4>$$
$$\rightarrow mul 1 < B \text{ add } <J_1, K1><3, 4>,$$
$$B \text{ sub } <J_2, K1><3, 4>>$$
$$\rightarrow mul 1 <\text{add } <J_1<3, 4>, K1<3, 4>>,$$
$$\text{sub } <J_2<3, 4>, K1<3, 4>>>$$
$$\rightarrow mul 1 < \text{add } <3, 1>, \text{sub}<4, 1>>$$
$$\rightarrow mul <4, 3> \rightarrow 12$$

Figure 15:
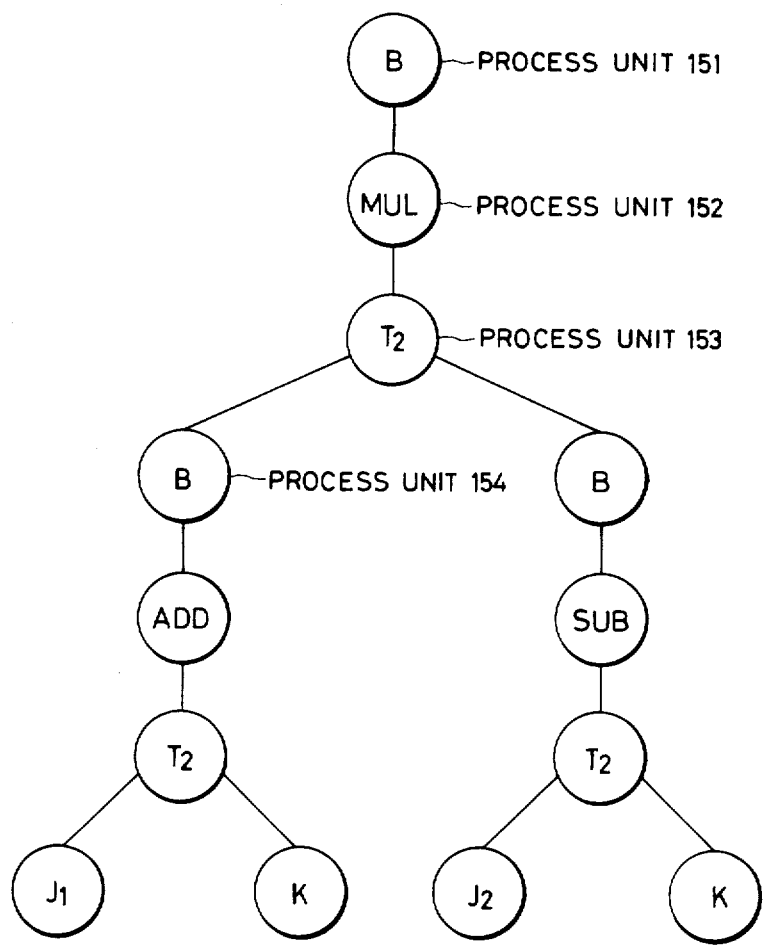
FIG. 15 is an explanatory diagram showing the way of assignment to process units in the present invention.
Figure 16:
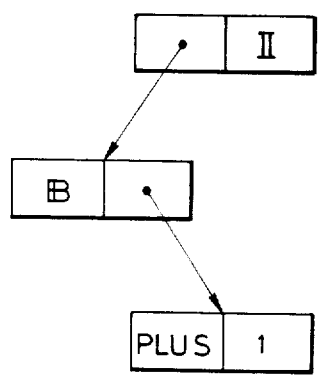
FIG. 16 is a diagram showing a combinator graph based on the Turner system.

When this course is illustrated, a network of process units as shown in FIG. 15 is formed.

It is not easy to subject this example to the evaluations of add and sub in parallel by the use of the Turner graph. That is, the Turner system curries the arguments of a function, transforms a multi-argument function into a higher order function of one argument and evaluates the higher order function, whereas the present system evaluates a multi-argument function by the use of tuples, and in principle, it readily realizes a parallel evaluation in the same number as that of the degrees of multiplicity of arguments.

Figure 2:
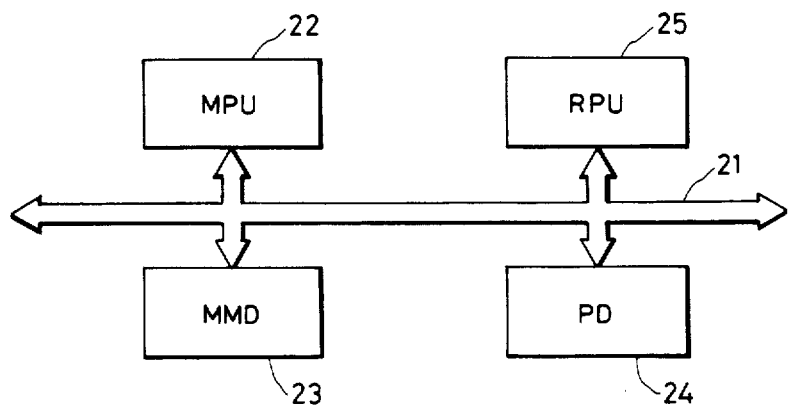
FIG. 2 is a block diagram showing an example of a computative apparatus in the present invention.

The first embodiment of the present invention will be described in the order of the hardware arrangement and operation thereof. Processes from a source program to execution are as shown in FIG. 1. These steps are actualized by an apparatus shown in FIG. 2. The apparatus is so constructed that a main processor unit 22 (MPU), a main memory device 23 (MMD), a peripheral device 24 (PD) and a reduction processor unit 25 (RPU) are coupled by a bus 21.

Figure 3:
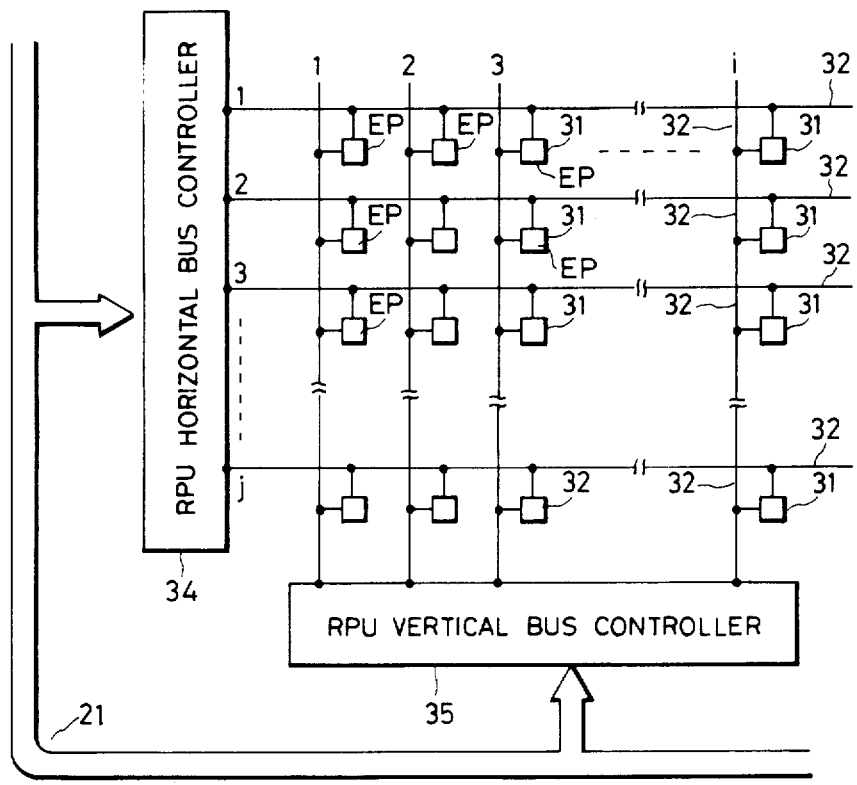
FIG. 3 is an arrangement diagram of a reduction processor unit which is the first embodiment of the present invention.

As shown in FIG. 3, the reduction processor unit is such that elementary processors (EPs) 31 are coupled in the shape of a matrix. It is connected to the external bus via horizontal and vertical bus controllers 34, 35.

As indicated at numeral 11 in FIG. 1, the program described in a functional language is decomposed into tuples, functions and variables and is transformed into combinator forms having the tuple structure. For example, the source program mentioned before:

func f (x, y: integer): integer= =(x+1)* (y−1) end f is transformed into combinator forms:

$$B \text{ mul } < B \text{ add } <J_1, K \ 1 >,$$
$$B \text{ sub } <J_2, K \ 1 >>$$

Figure 4:
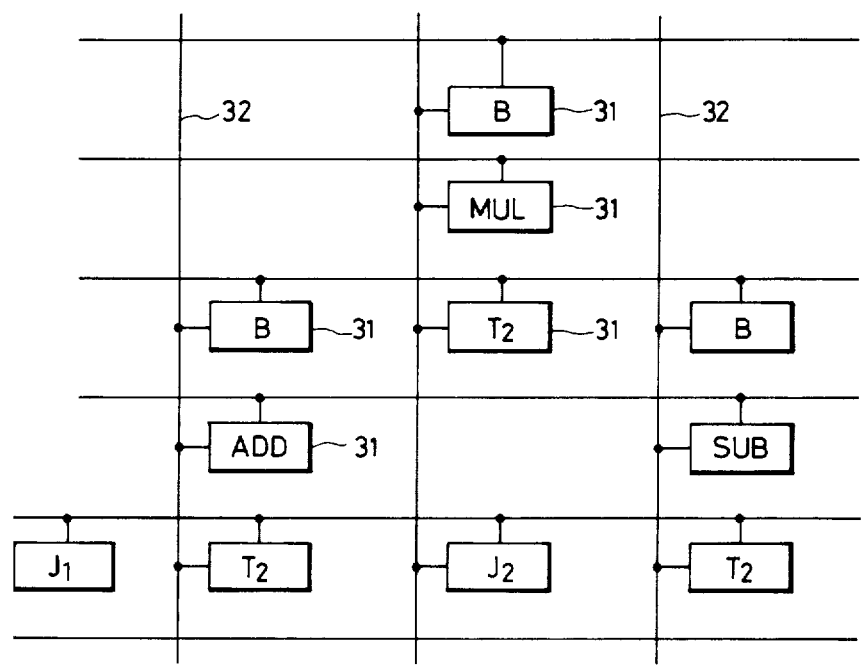
FIG. 4 is an explanatory diagram showing an example in which combinator graphs in the present invention are assigned to FIG. 3.
Figure 13:
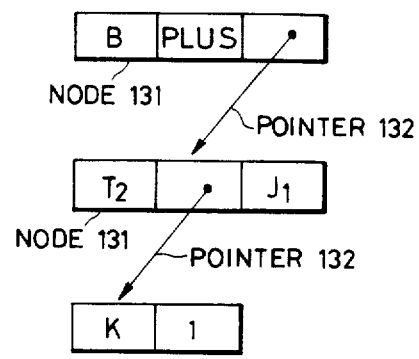

The corresponding graphical expression is shown in FIG. 13. A method of assigning FIG. 13 to the EPs is realized by supposing the assignment to the respective process units as shown in FIGS. 14 and 15. The V-codes transformed into the combinator forms are stored in the main memory device, and are assigned to the EPs at a stage preceding the execution. An example of results obtained by assigning the graphical expression of FIG. 13 to the EPs is shown in FIG. 4.

The exchange of information among the EPs is performed with packets to be described later, which are transmitted through the horizontal or vertical bus controller 34 or 35 in FIG. 3.

Figures 7, 8:
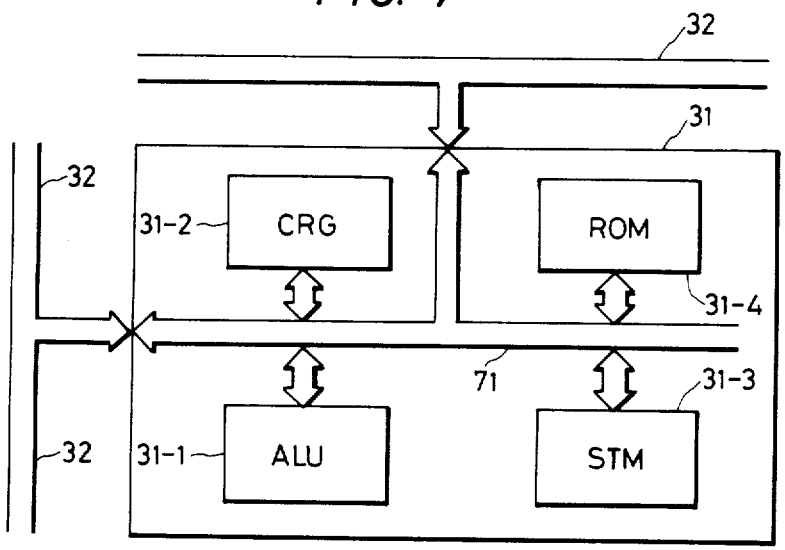
FIG. 7 is a block diagram showing the arrangement of the elementary processor in the present invention.
FIG. 8 is a diagram showing the contents of a combinator word in the present invention.

FIG. 7 shows a detailed block diagram of the EP 31. The EP is composed of an arithmetic/logic unit 31-1 (ALU), a control register 31-2 (CRG), a stack area 31-3 (STM) and a read only memory 31-4 (ROM).

The basic operation instructions of the EP are stored in the ROM. The basic operation instructions include arithmetic instructions add, sub, mul, div etc., and besides, combinator instructions which are the instructions of operations corresponding to S, B, I, K, T etc. In addition, as a result of the assignment of the nodes of the V-codes to the processors, a combinator word 81 (COW) shown in FIG. 8 is created in each processor. Addresses in FIG. 8 signify the identifiers of the processors, and are expressive of the arrangement $<i, j>$ of the reduction processor unit (RPU).

Before stating an operating example, the organization of the packet as well as the stack area will be described.

Figure 9:
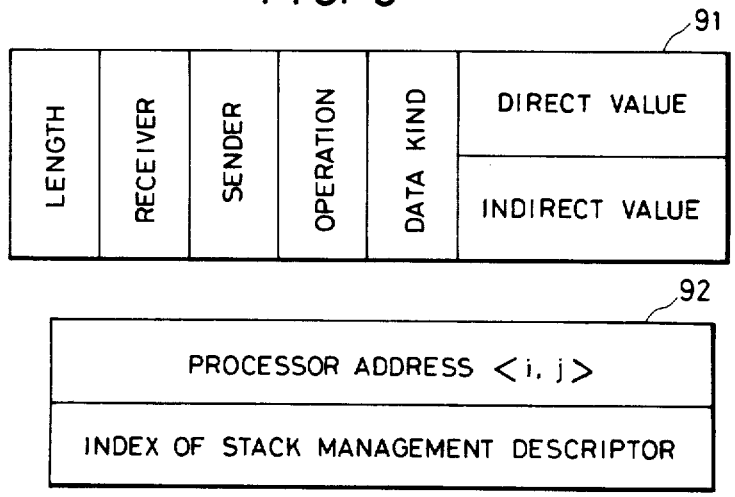
FIG. 9 is an explanatory diagram showing the contents of a packet in the present invention.

The packet 91 has a format in FIG. 9. Here,
(1) length... length of the packet
(2) receiver... receiving address "Addresses" are the identifiers $<i, j>$ of the processors and the indexes of stack management descriptors (ISMDTs) [to be described later].

(3) sender... sending address
(4) operation... force evaluation, lazy evaluation, demand evaluation, results
(5) data kind
  direct value... value itself
  indirect value... value stored in a location indicated by an address (92)

Figure 10:
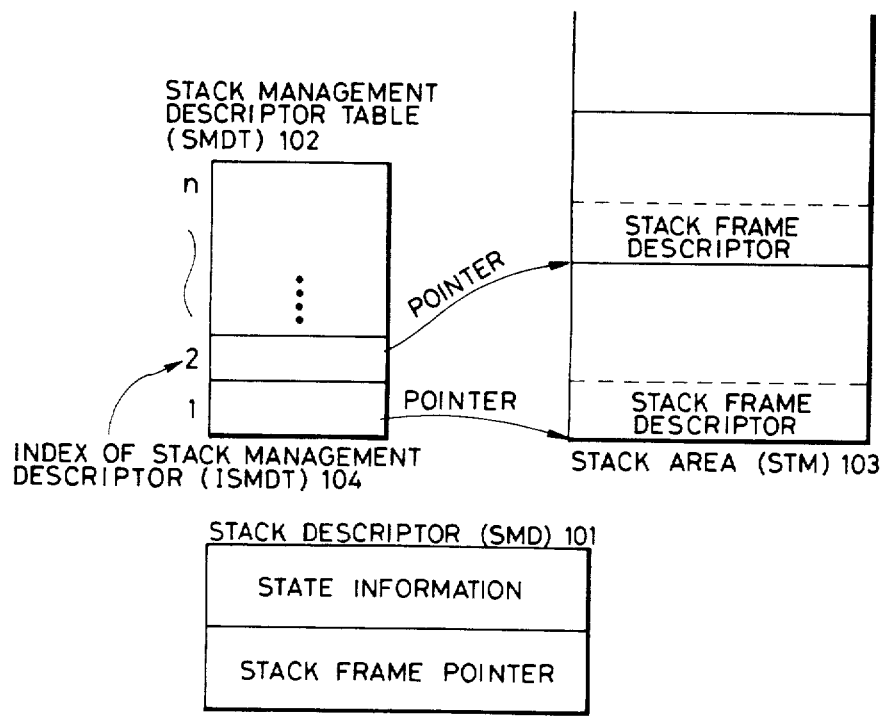
FIG. 10 is an explanatory diagram showing the relationship between a stack management descriptor and a stack area in the present invention.

The relationship of a stack and the management descriptor thereof in the stack area (STM) is shown in FIG. 10. The stack management descriptor 101 (SMD) is provided with status information and a stack frame pointer.

The status information contains:
(1) "used" flag... Under use of the descriptor.
(2) number of reference times... Number by which the stack referred to data.
(3) "evaluated" flag... Value is stored in the stack.
(4) "under evaluation" flag... At present, the force or lazy evaluation is proceeding.
(5) others.

When the stack has been filled up, a garbage collector operates to compact frames within the stack, and the stack frame pointers are updated on the basis of the results.

A stack frame descriptor is created in the corresponding frame each time the stack frame is secured. In the stack frame descriptor, there are set the size of the stack frame, received data, and a "results received" flag in the case of receiving a plurality of results. The area of the frame other than the descriptor is used for result data and a job area.

Figure 5:
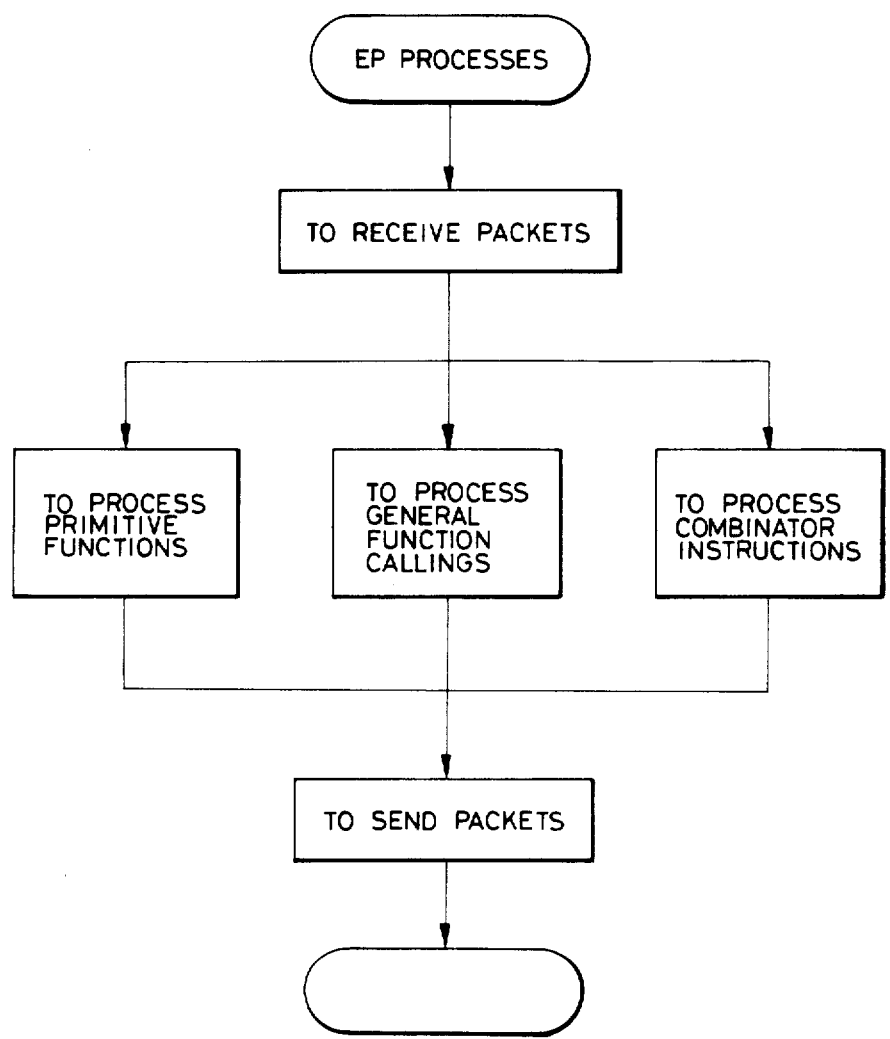
FIG. 5 is a flow diagram showing the processes of an elementary processor in the present invention.

Processes in the EP 31 in FIG. 7 are shown in FIG. 5. First, a function calling system will be explained in detail. Function callings are classified into the case of primitive functions which can be directly executed by hardware, such as addition and subtraction, and the case of general functions which have been defined by a programmer.

In general, the function callings need to be previously put into a structure which is recursive and which can be executed in parallel. The combinator word (COW) which is set in the processor for the function calling is as shown in FIG. 8.

As illustrated in FIG. 10, the relation of correspondence with applicative data is indicated with the index of the stack management descriptor (ISMDT) 104. In sending data, the ISMDT of the corresponding processor is always sent, and data returned as a result is checked on the basis of the ISMDT.

Processes in the case of the primitive function are as follows:

(1) Demand Process

A received packet is saved in a stack, and the packet with the corresponding ISMDT affixed thereto is sent to a processor which is indicated by the argument address of a combinator word. Status information at this time is force evaluation.

(2) Result Process

When a result argument value has been received from the processor of the argument address, the ISMDT of the packet is checked, and the value is piled on the stack. At this time, the contents of an old stack frame descriptor are copied, and a frame pointer is updated.

Thereafter, the primitive function is applied to the argument value, to create a packet in which the value of the executed result is put and which is sent to the return address of the combinator word. Next, an SMDT 102 is set free.

Figure 6:
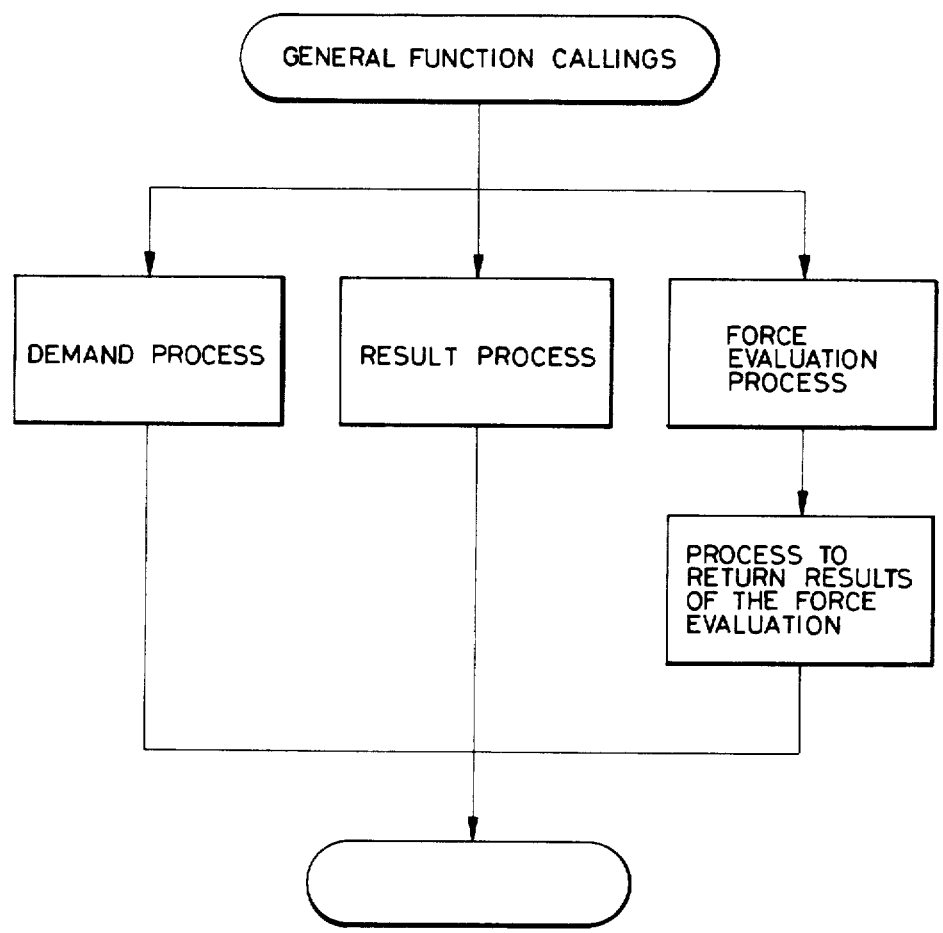
FIG. 6 is a flow diagram showing the processes of general function callings in the present invention.

The case of the general function calling is carried forward in accordance with a flow chart in FIG. 6:

(1) Demand Process

A received packet is saved in a stack, and the packet with the corresponding ISMDT affixed thereto is sent to a processor indicated by the link address of a combinator word. A status here is lazy evaluation.

(2) Force Evaluation Process

When the indication of force evaluation for an argument has been received, the sender of the packet is put in a stack frame descriptor corresponding to the ISMDT, and the data of a stack frame has argument No. affixed thereto and is sent to an argument-address processor.

(3) Process to Return Results of Force Evaluation

Results returned from the argument-address processor are delivered to a requester for the force evaluation.

(4) Result Process

The evaluated results of the function body are received, and are sent to a demander indicated by a result address. Besides, in order to eliminate the remainder of the lazy evaluation based on the same ISMDT, a packet which erases ISMDT information within the T processor corresponding to the ISMDT is sent to the T processor indicated by the argument address.

Figure 11:
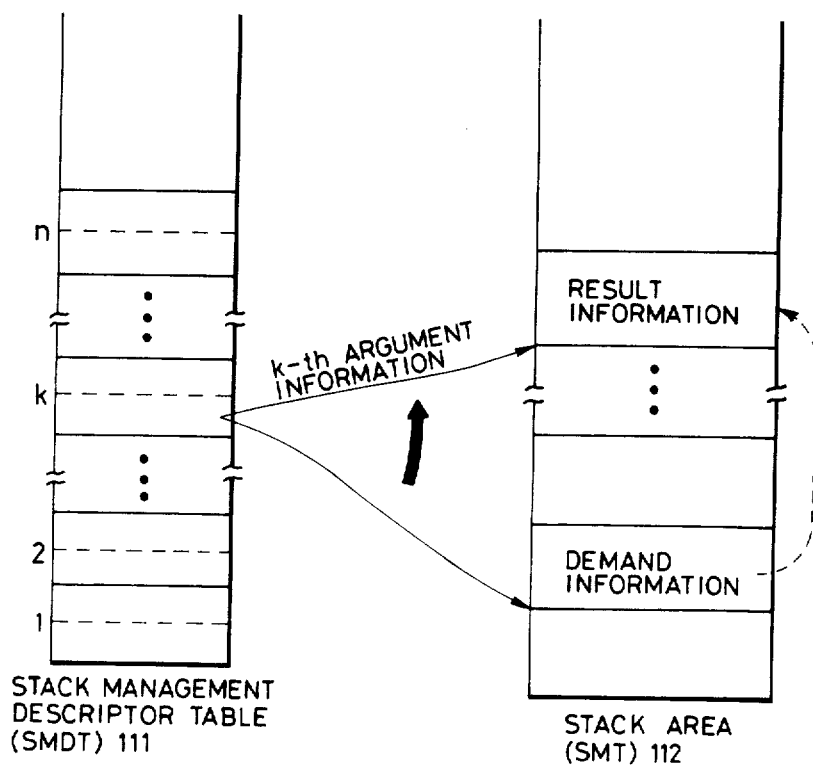
FIG. 11 is an explanatory diagram showing a system of stack management for a combinator T indicative of a tuple in the present invention.
Figure 12:
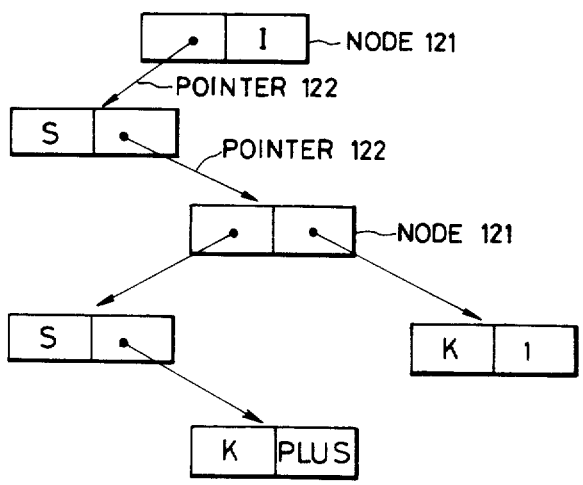
FIG. 12 is a diagram showing a Turner graph which is a known example.

Lastly, the system of the T processor for processing tuples will be explained. In order to allow a recursive program, a stack as shown in FIG. 11 is exploited. In general, when there are n arguments, the parallel processes of the arguments are carried out in compliance with the individual evaluation demands for the respective arguments.

(1) Process to Demand Argument Evaluation

Since argument evaluation realizes the system of lazy evaluation, if the evaluation has been made is checked. If not made, the argument evaluation is performed.

(2) Process of Result of Argument Evaluation

The result of the argument evaluation is saved in the stack, an "evaluated" flag is set in status information, and a packet for a result value is created and sent to a demander for the argument evaluation.

(3) Elimination of Argument Evaluation Results

At the time at which the evaluation of a function body has ended, the argument evaluation results corresponding to the demand for the evaluation of the function are removed from the stack.

The embodiment thus far described provides a processing apparatus for functional languages etc. which permits the efficient execution of the functional or applicative programming languages that could not be expected with conventional von Neumann type machines.

That is, unlike procedural languages presently forming the mainstream, functional or applicative programming languages capable of readily developing programs of higher productivity and reliability can be utilized, and the invention is effective to increase the data processing efficiency in this field.

[Second Embodiment]

The principle of the second embodiment of the present invention will be described.

The system of the present invention for processing functional or applicative programming languages uses combinators likewise to the Turner system, but it is characterized in that a product structure which treats the arrayal of parameters as one object is introduced into a combinator graph, whereby a multi-parameter function can be handled as it is without being curried.

The combinator graphs having the product structures are defined as follows, and shall hereinbelow be called V-codes:

(i) Constants are V-codes.
(ii) Variables and functions are V-codes.
(iii) A product $<V_1, \ldots, V_n>$ ($V_i$: V-codes) is a code.
(iv) An application fV (f: function or combinator, V: V-code) is a V-code.
(v) combinators S, K, B, C, W, I and $J_i$ are V-codes.

Here, $J_i$ is defined by the following formula:

$$J_i<V_1, \ldots V_n> = V_i (1 \leq i \leq n)$$

The other combinators shall be defined in V-codes by the same definition formulas as in the Turner system.

Since, with the V-codes, the product of any order can be handled as one object, the V-code expression can be regarded as having an n-ary tree structure. The V-codes expressed as a graph like an n-ary tree shall be called the V-graph.

As shown in FIG. 17, the program processing method of the present invention consists of three principal steps. The first step 221 inputs the source code of a program, and transforms the denoted applicative structure into a corresponding V-code expression. The second step 222 inputs the V-code expression containing variables, obtained as the result of the step 221 and subjects it to abstraction, thereby to eliminate all the variables and to transform the above V-code expression into a V-code expression containing no combinator (containing no variable). The third step 223 inputs the V-code expression obtained as the result of the step 222 (a combinator graph containing no variable), and evaluates it through reductions thereof.

At the first step 221, a multi-parameter function f assuming n parameters is handled as a function of one parameter which is applicative to a product consisting of n parameters. That is, the V-code expression of a program denoted by $f(x_1, \ldots, x_n)$ becomes $f<x_1, \ldots x_n>$.

The second step 222 is effected in such a way that the V-code expression corresponding to the body of the function (the output of the step 221) is abstracted with the formal parameter of the single-parameter function (one variable) or the product of the formal parameters of the multi-parameter function (the product of n variables). The abstraction is performed by applying abstraction rules listed below. Hereunder, a V-code E abstracted with V shall be written [V] E.

For x, $x_i$, y: variables, $\bar{x}=<x_1, \ldots, x_n>$, and $E_i$: V-code, $$[x]y = \begin{cases} I & (y = x) \\ Ky & (y \neq x) \end{cases}$$

$$[x](E_1, E_2) = \begin{cases} S([x]E_1)([x]E_2) & (x \epsilon E_1, x \epsilon E_2) \\ BE_1([x]E_2) & (x\ E_1, x \epsilon E_2) \\ C([x]E_1)E_2 & (x \epsilon E_1, x\ E_2) \\ K(E_1 E_2) & (x\ E_1, x\ E_2) \end{cases}$$

$$[x]<E_1, E_2, \ldots, E_n> = \begin{cases} <[x]E_1, [x]E_2, \ldots, [x]E_n> \\ (\ )x \epsilon E_i) \\ K<E_1, E_2, \ldots, E_n> \\ ((\ x \epsilon E_i) \end{cases}$$

$$[\bar{x}]y = \begin{cases} J_j (y = x_j) \\ Ky ( \quad y \neq x_i) \end{cases}$$

$$[\bar{x}](E_1 E_2) = \begin{cases} S([x]E_1)([x]W_2) \\ (\ x_j \epsilon E_1, x_k \epsilon E_2) \\ BE_1([x]E_2) \\ (\ x_j\ E_1, x_k \epsilon E_2) \\ C([x]E_1)E_2 \\ (\ x_j \epsilon E_1, x_k\ E_2) \\ K(E_1 E_2)(\ x\ E_1, x\ E_2) \end{cases}$$

$$[\bar{x}]<E_1, \ldots, E_n> = \begin{cases} <[\bar{x}]E_1, \ldots, [\bar{x}]E_n> \\ ((\ )(\ )x_j \epsilon E_j) \\ K<E_1, \ldots, E_n> \\ ((\ )(\ )x_1\ E_1) \end{cases}$$

The third step 223 inputs the V-code expression of the program obtained as the result of the step 222 (consisting of combinators, a primitive function and a product) and subjects it to reductions in the normal order, thereby to run the program. The definition formulas of the respective combinators determine the corresponding graph reductions. The application of the product of a function is defined by $<f_1, \ldots f_n>X = <f_1 X, \ldots f_n X>$.

For example, the function suc $(X) = 1 + X$ mentioned before becomes:

$$\text{suc } X = \text{plus}<1, X>$$

owing to the first step 221. Further, this is transformed into:

$$\text{suc} = [x] (\text{plus} < 1, X >) \quad \text{①}$$

$$= B \text{ plus} ([X] < 1, X >)$$

11

Figure 18:
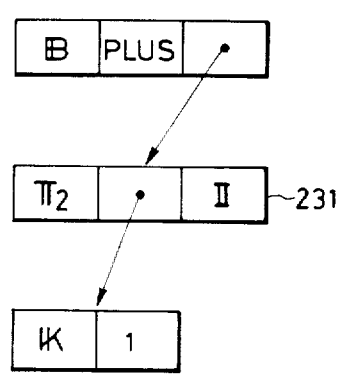
FIG. 18 is a diagram showing a combinator graph which uses products.

-continued $$= B \text{ plus } <K1, I>$$

by the second step 222. The V-graph corresponding to ① is shown in FIG. 18. $T_2$ node 231 in the figure is a node which denotes a product structure of order 2. Similarly, a product of order n is denoted by $T_n$ node. With the aforementioned suc, when the program is suc 3, the V-code expression of the program which is obtained as the result of the second step 222 is:

$$\text{suc } 3 = B \text{ plus } <I, K1>3 \qquad ②$$

Figure 19A:
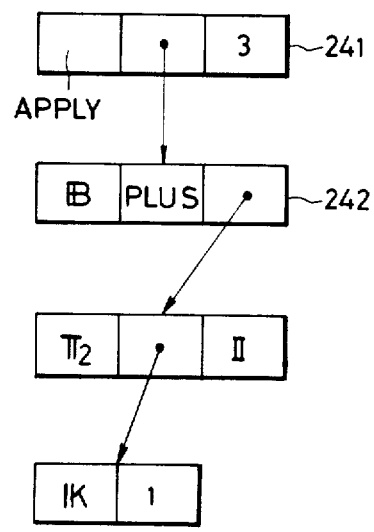
FIGS. 19(a)–19(e) are diagrams showing the course of the reductions of suc 3 according to the system of the present invention.
Figure 19B:
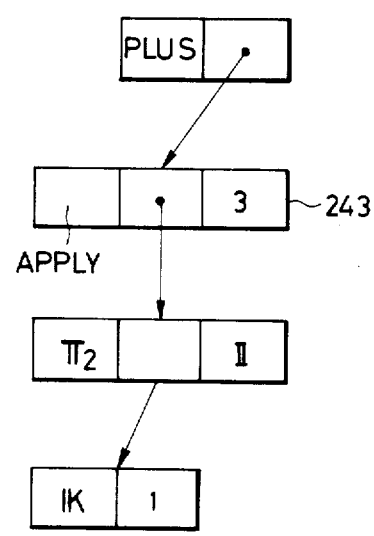
Figure 19C:
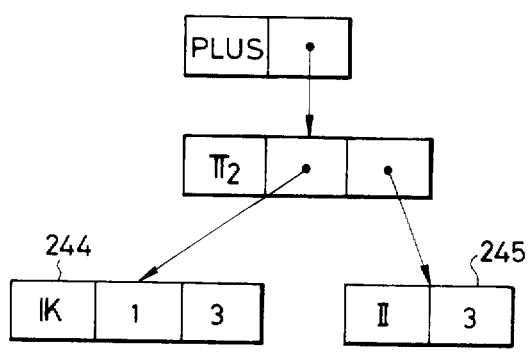
Figures 19D, 19E:
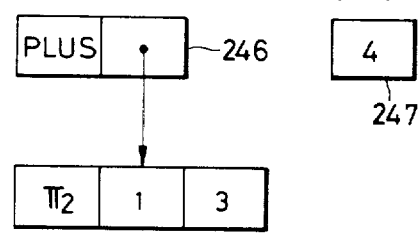

The V-graph corresponding to ② is shown in FIG. 19(a). Apply node 241 in the figure is used when it is desired to clearly write the applier of a V-code. The third step 223 receives the V-code expression as indicated by ② (namely, the V-graph in FIG. 19(a), performs reductions as:

$$② \rightarrow \text{plus } (<K1, I>3) \qquad ③$$
$$\rightarrow \text{plus } <K13, I3> \qquad ④$$
$$\rightarrow \text{plus } <1, 3> \qquad ⑤$$
$$\rightarrow 4 \qquad ⑥$$

and produces a result 4 (numeral 247 in FIG. 19(e)). The V-graphs corresponding to ③, ④, ⑤ and ⑥ are respectively shown in FIGS. 19(b), 19(c), 19(d) and 19(e). Nodes having been the objects of the reductions are one 242 in ②→③, one 243 in ③→④, ones 244 and 245 in ④→⑤ and one 246 in ⑤→⑥, respectively.

Next, the superiority of the present system employing products will be explained over the Turner system. As an example, a function:

$$f(x, y) = (x+1) * (y-1)$$

will be taken. With the Turner system, the curried expression of the function body:

$$f \times y = \text{mul (add } x1) \text{ (sub } y1)$$

is successively abstracted with parameters y and x as follows:

$$f = [x] ([y] (fxy)) \qquad ⑦$$

$$= [x] ([y] (\text{mul (add } x1) \text{ (sub } y1)))$$

$$= [x] (B (\text{mul (add } x1)) (C (B \text{ sub } I) 1))$$

$$= C (B B (B \text{ mul } (C (B \text{ add } I) 1))) (C (B \text{ sub } I) 1)$$

In this manner, it is in principle required to traverse a text that number of times which is equal to the number of the parameters. Besides, the length of the combinator graph to be obtained becomes the order of $n^2$ in the worst case, n denoting the length of the source program.

When this example is processed with the present system employing products, it becomes:

$$f<x, y> = \text{mul } <\text{add}<x, 1>, \text{sub}<y, 1>>$$

owing to the first step 221, and $$f = [<x, y>] (f <x, y>) \qquad ⑧$$

$$= [<x, y>] (\text{mul } < \text{add } <x, 1>, \text{sub } <y, 1>>)$$

12

-continued $$= B \text{ mul } < B \text{ add } <J_1, K1>, B \text{ sub } <J_2, K1>>$$

is obtained owing to the second step 222. With the present system, the combinator graph is obtained with one time of text traverse in principle irrespective of the number of parameters. It is also understood that the expression ⑧ obtained is more concise than the result ⑦ of the Turner system.

Now, the second embodiment of the present invention will be described in the order of the internal form of the V-graph, the reduction procedure of the V-graph in the normal order and the hardware arrangement.

Figure 20:
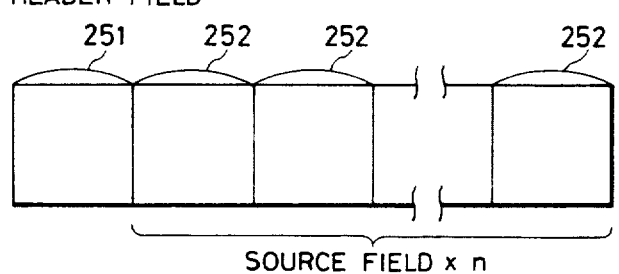
FIG. 20 is an arrangement diagram showing the node of a variable-length cell with a header.
Figure 21:
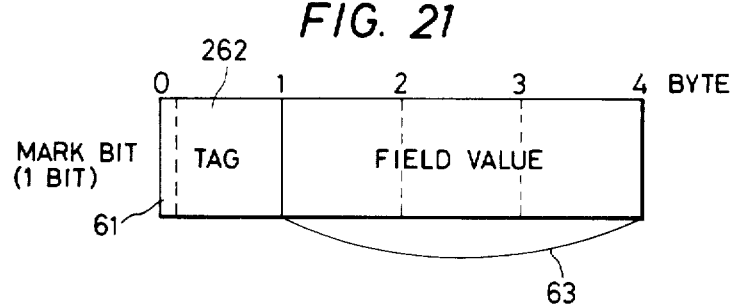
FIG. 21 is a diagram showing the format of a header field.

An n-ary tree structure, in which each node can have a variable number of sub nodes, is employed as the internal form of the V-code in the present embodiment. As shown in FIG. 20, each node is denoted by a variable length cell with a header which consists of a header field 251 of one word length and source fields 252 of n word lengths ($n \geq 0$). The header field 251 denotes the kind of the node. The internal form of the header field 251 is as shown in FIG. 21. It is composed of a mark bit 261 for garbage compaction, a tag 262 which denotes the sort of the node, and a field value portion 263 whose significance is determined according to a tag value (the value of the tag 262). Depending upon the tage values (the values of the tags 262), the nodes are classified into constants (real number, integer, character, logic value), system constants (combinator, incorporated function), a product (column) and a selector ($J_i$). Field values (the values of the portions 263) are respectively construed as a constant value, system constant No., the order of the product, and the value of the index of the selector (which selector is to be selected) in accordance with the tag values (the values of the tags 262). While the form of the source field is similar, tag values allowed correspond to a character constant, a logic constant, a system constant, a selector and a pointer. For adopting an efficient garbage compaction system, it is necessary that the size of each node (namely, the number of the source fields) can be determined from only the contents of the header field 251. Therefore, a pointer value is not accepted as the header field 251. Instead, the combinator 'apply' which clearly denotes the application of a function is employed. This combinator is defined by:

$$\text{apply } fx = fx$$

By way of example, let's consider the internal form of a function for finding a greater one of two numbers:

$$\max(x, y) = \text{if } x> = y \text{ then } x \text{ else } y \text{ endif}$$

The first step 221 provides the V-code of max $<x, y> = \text{cond } <ge<x, y>, x, y>$. Here, $\text{cond } <P, V1, V2>$ denotes a function corresponding to the conditional branch of if p then V1 else V2 endif, and ge a predicate for the comparison of values. This V-code is turned by the second step 222 into:

$$\max = [<x, y>] (\text{cond } < ge <x, y>, x, y>)$$

$$= B \text{ cond } <B \text{ ge } <J_1, J_2>, J_1, J_2>$$

Figure 22:
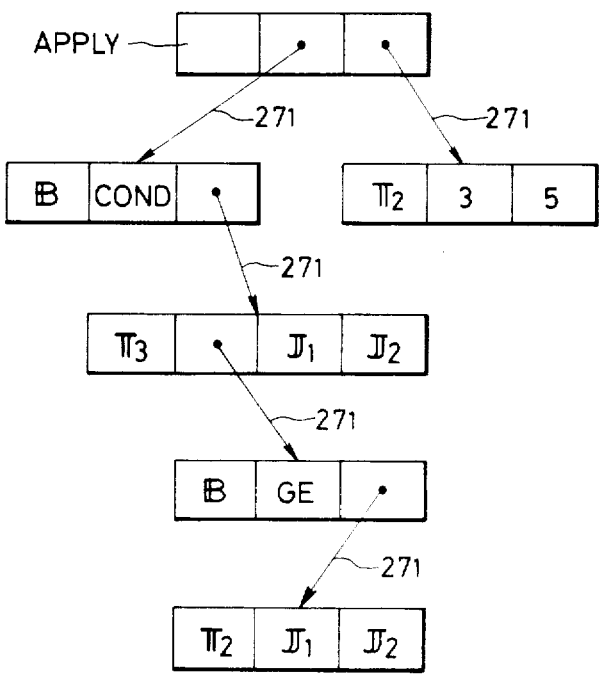
FIG. 22 is an explanatory diagram showing the internal form of a V-graph which corresponds to max $<3, 5>$.

Accordingly, the V-code expression for a program max (3, 5) employing this function becomes:

max <3, 5> = B cond<B ge<J$_1$, J$_2$>, J$_1$, J$_2$><3, 5> and the internal form thereof becomes a graph as shown in FIG. 22. Arrows 271 in FIG. 22 indicate reference relations by pointers.

Figure 23:
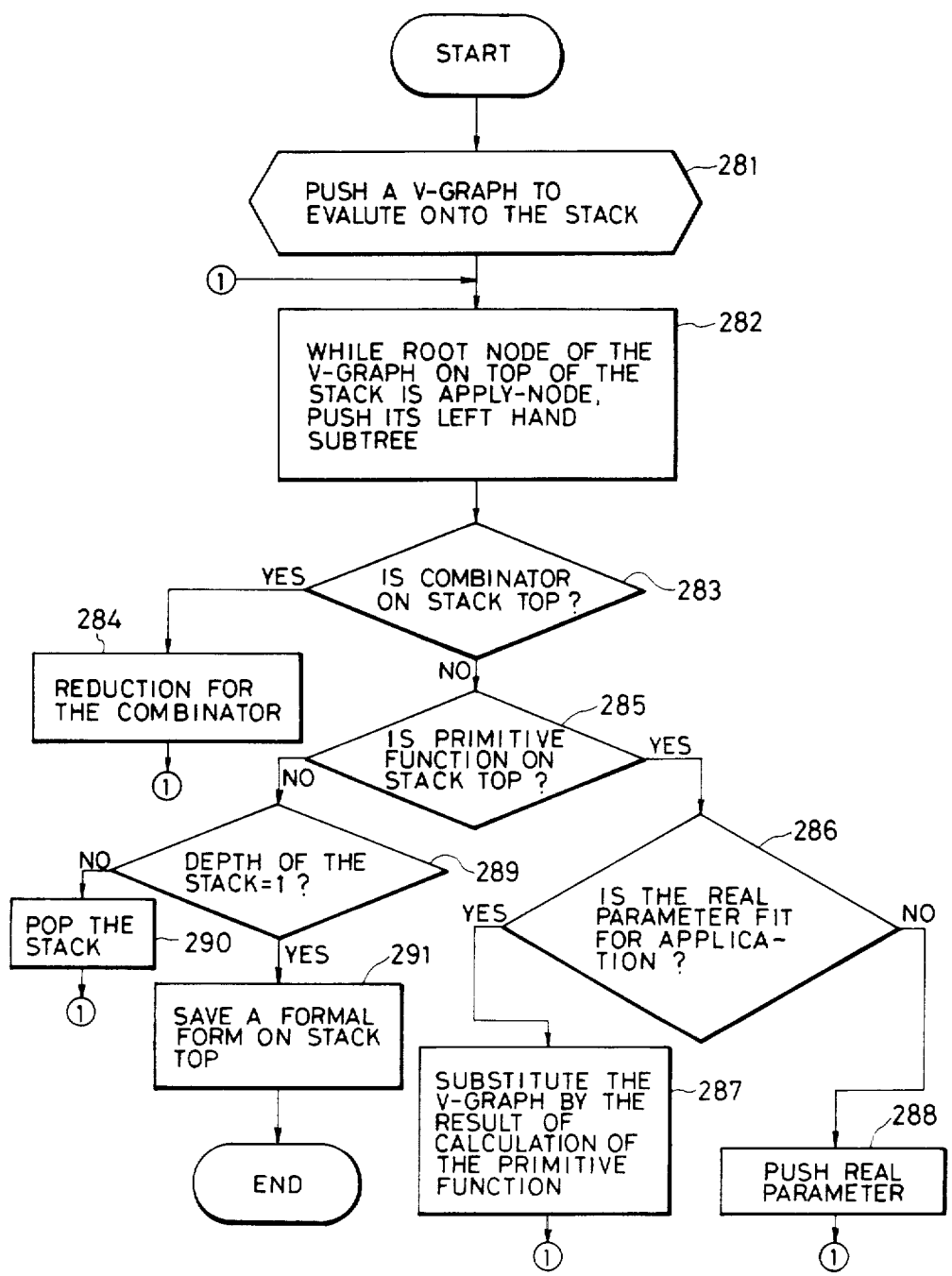
FIG. 23 is a flow chart showing a reduction operation.

Shown in FIG. 23 is a flow chart of reductions which are carried out for the present embodiment by the third step 223. The outline will be explained.

(281) The V-graph to be reduced now is pushed onto a stack and is followed by (282).

(282) While the top of the stack is the apply-node, keep its function part (left-hand subtree) pushed. Then, the control proceeds to (283).

(283) If the stack top is a combinator node, it is examined. When the condition is met, the control proceeds to (284), and when not, the control proceeds to (285).

(284) A graph operation corresponding to the combinator node of the stack top (as defined by the combinator) is executed, whereupon the control proceeds to (282).

(285) If the stack top is a primitive function node, it is examined. When the condition is met, the control proceeds to (286), and when not, the control proceeds to (289).

(286) It is checked if a real parameter corresponding to the primitive function of the stack top is in the form in which the function is applicable. When the function is applicable, the control proceeds to (287), and when not, the control proceeds to (288).

(287) Calculation for the real parameter of the function of the stack top is executed, and the corresponding V-code is substituted by the resultant expression. Then, the control is returned to (282).

(288) The real parameter of the function of the stack top is pushed, and the control is returned to (282).

(289) It is checked if only the stack top exists in the stack (if the stack is emptied by pop). When the condition is met, the control proceeds to (291), and when not, the control proceeds to (290).

(290) The stack is popped, and the control proceeds to (282).

(291) Since the result of the reductions (normal form) exists in the stack top, it is processed to be printed or saved in a file. Then, the reductions of the third step 223 end.

Figure 24:
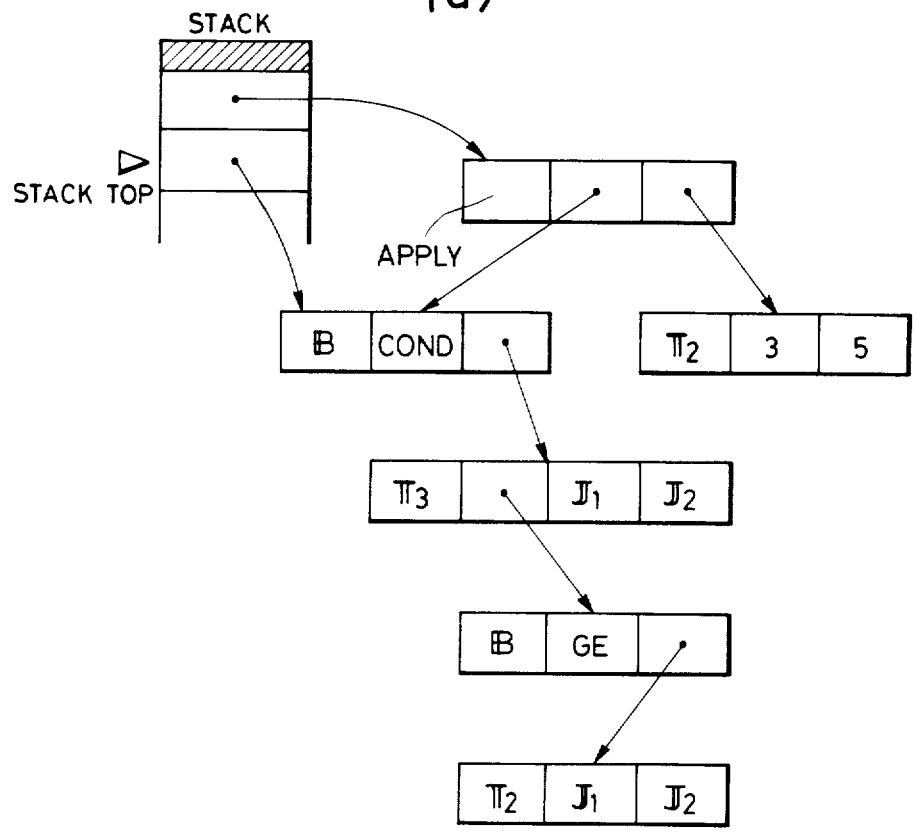
FIGS. 24(a)–24(j) are explanatory diagrams showing the operations of stack at the time at which reductions for evaluating max $<3, 5>$ are performed.
Figure 24:
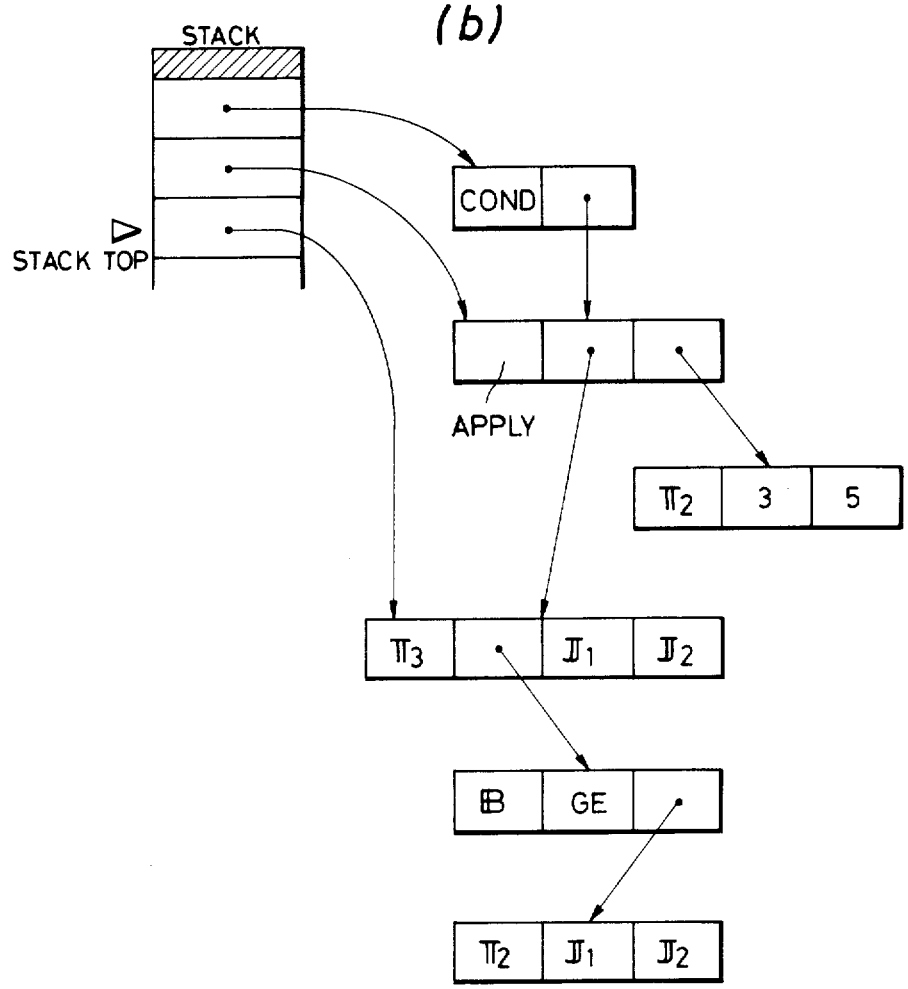
Figure 24:
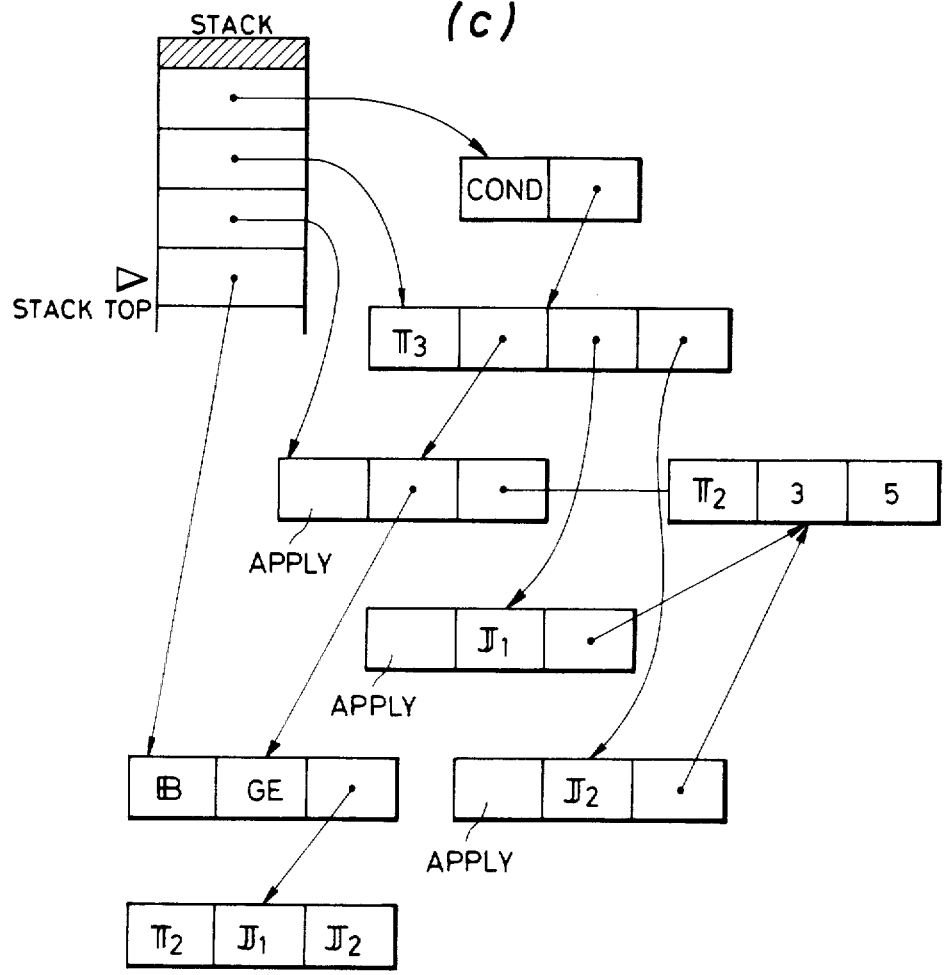
Figure 24:
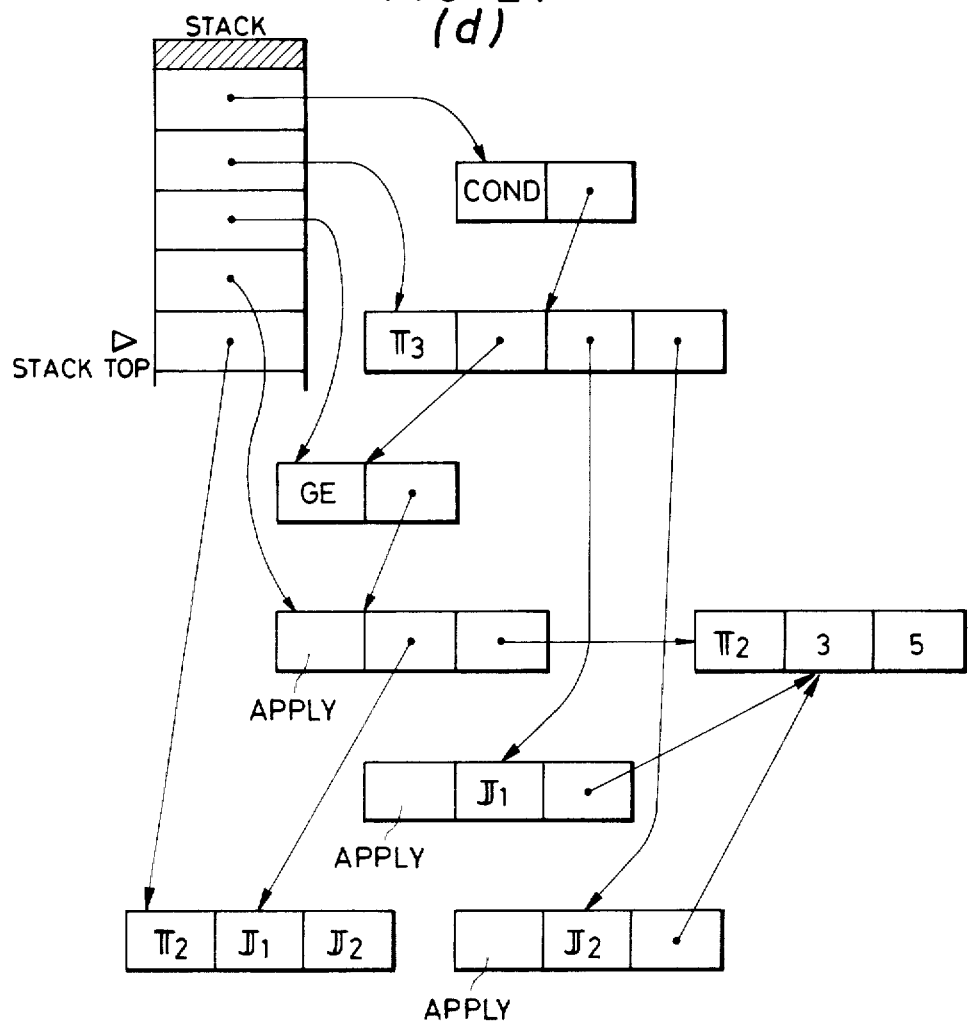
Figure 24:
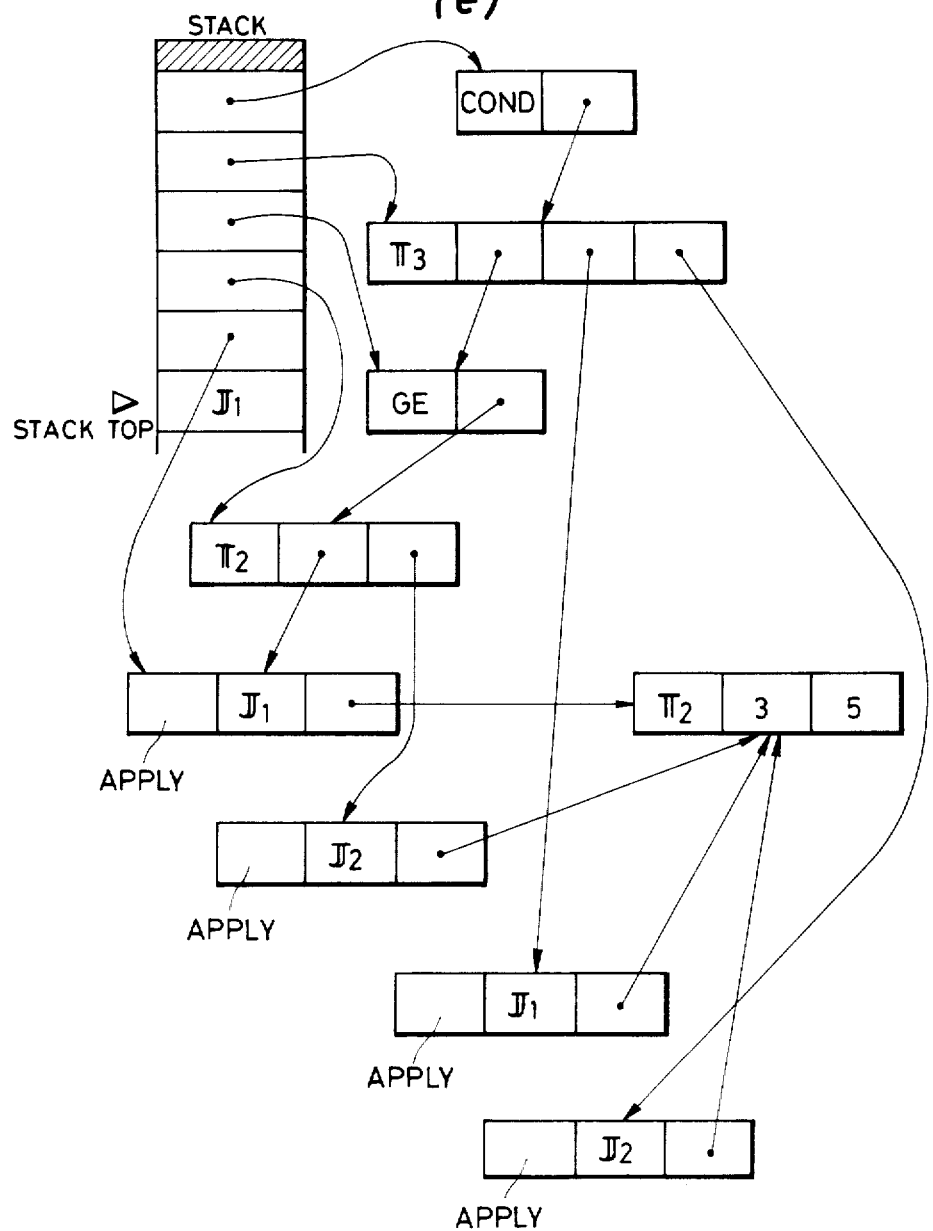
Figure 24:
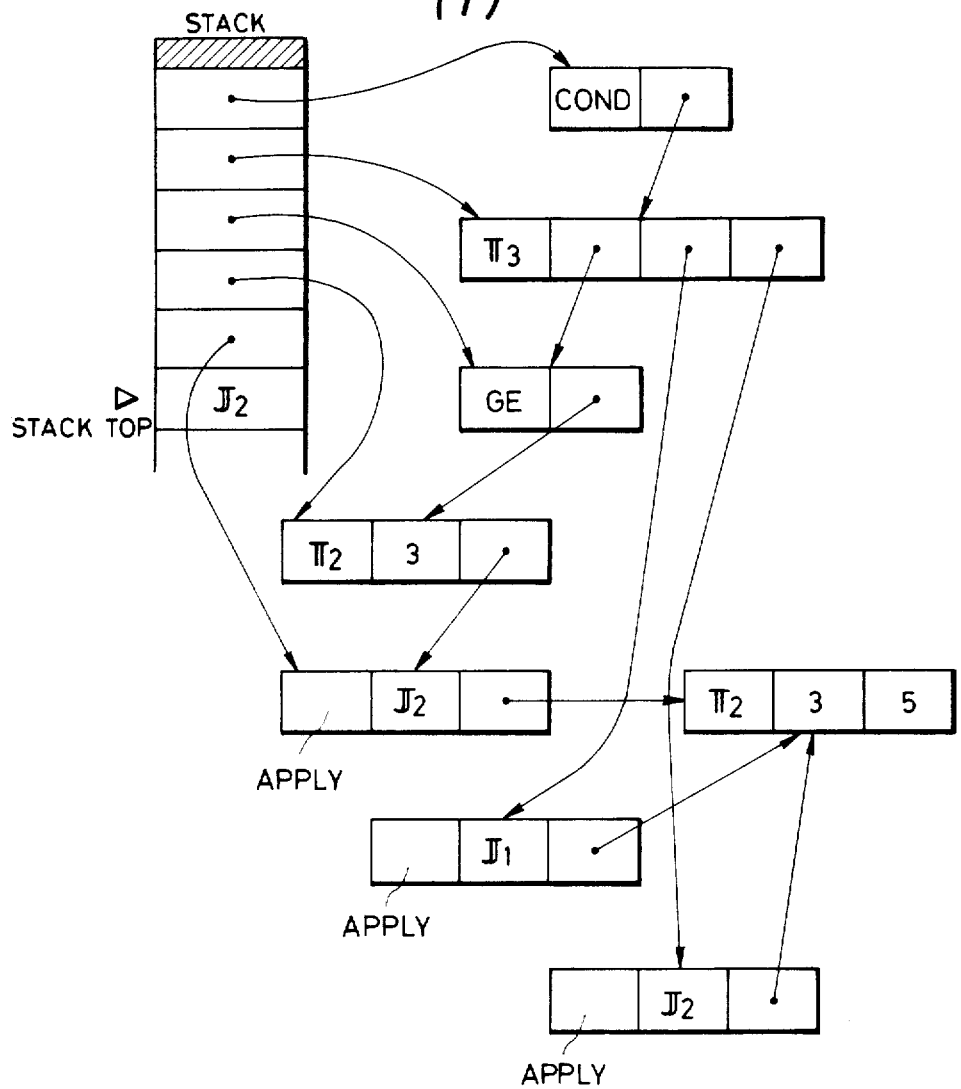
Figure 24:
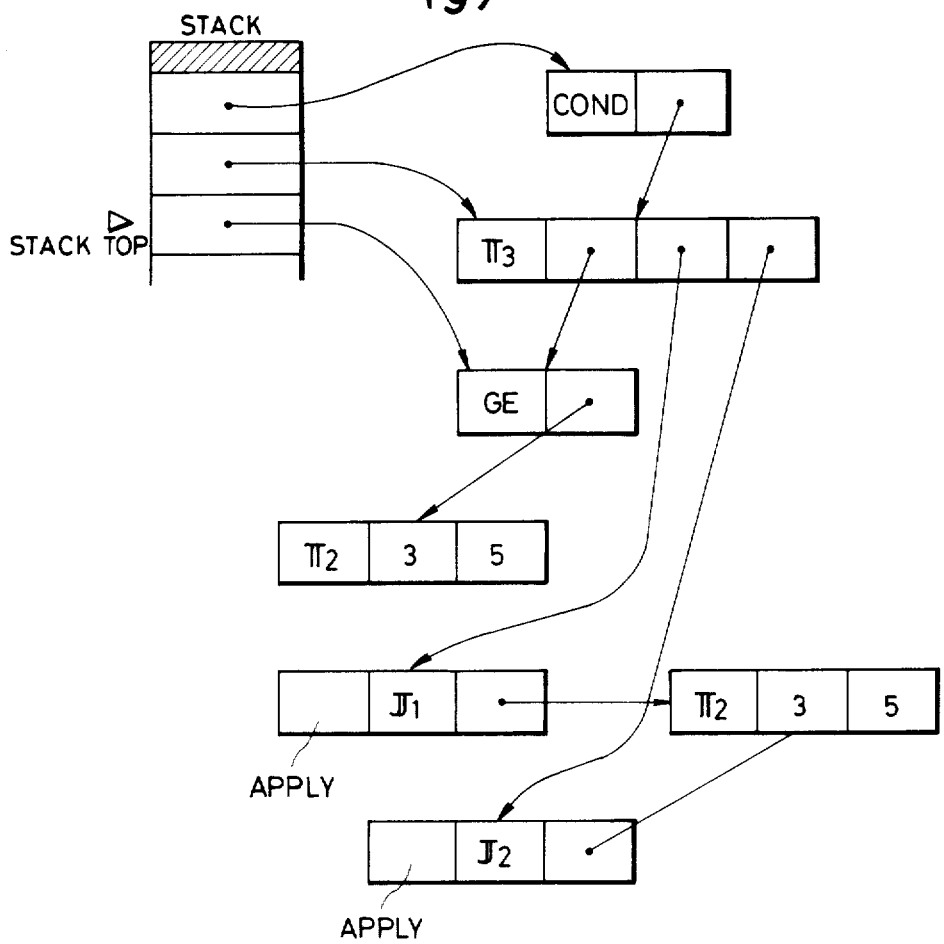
Figures 24H, 24I, 24J:
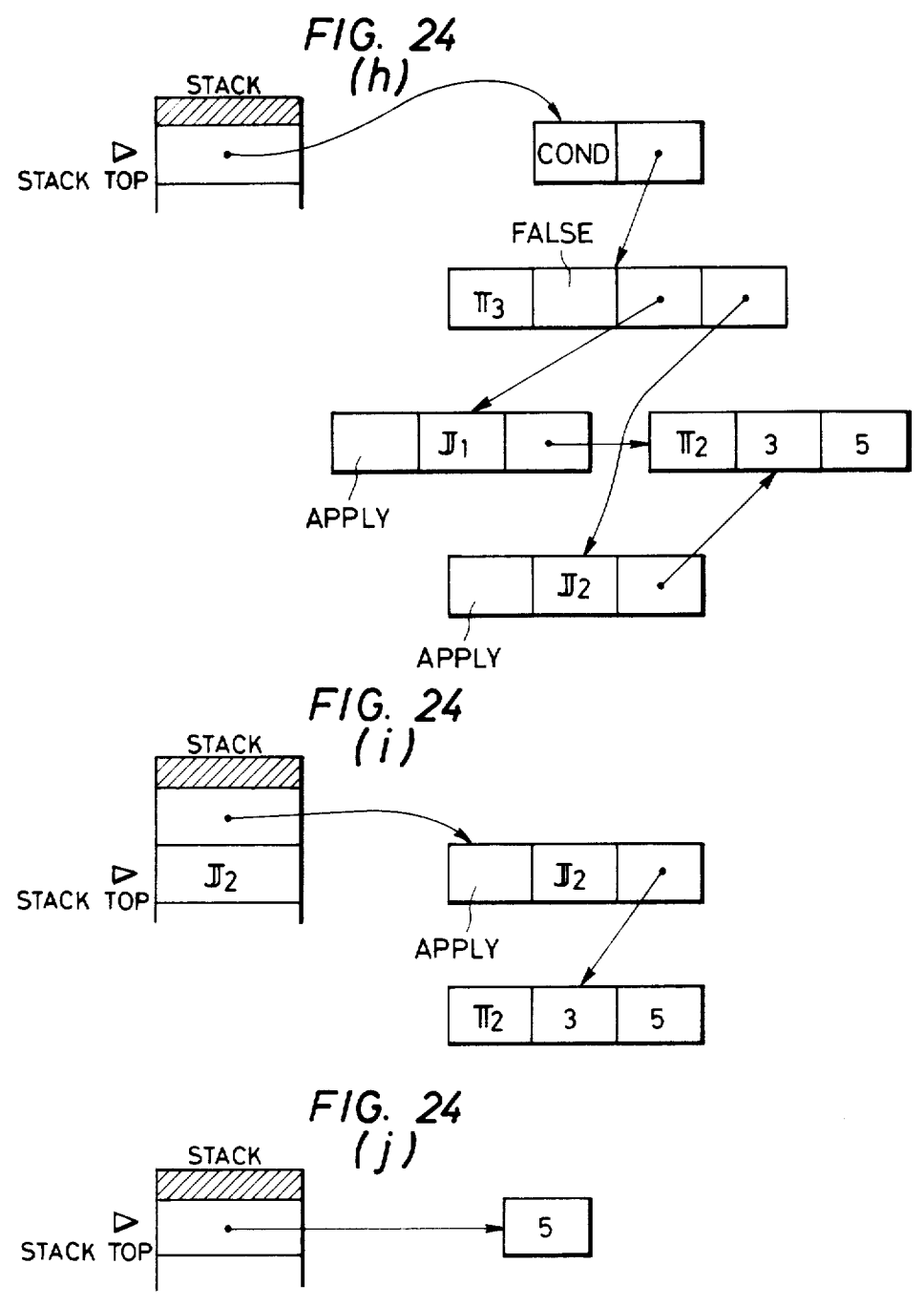

By way of example, the status changes of the stack and the contents of V-graphs in the reductions of the V-graph in FIG. 22 are shown in FIGS. 24(a), 24(b), . . . and 24(j). In each figure, the combinator or function at the stack top becomes the object of the reduction.

Figure 25:
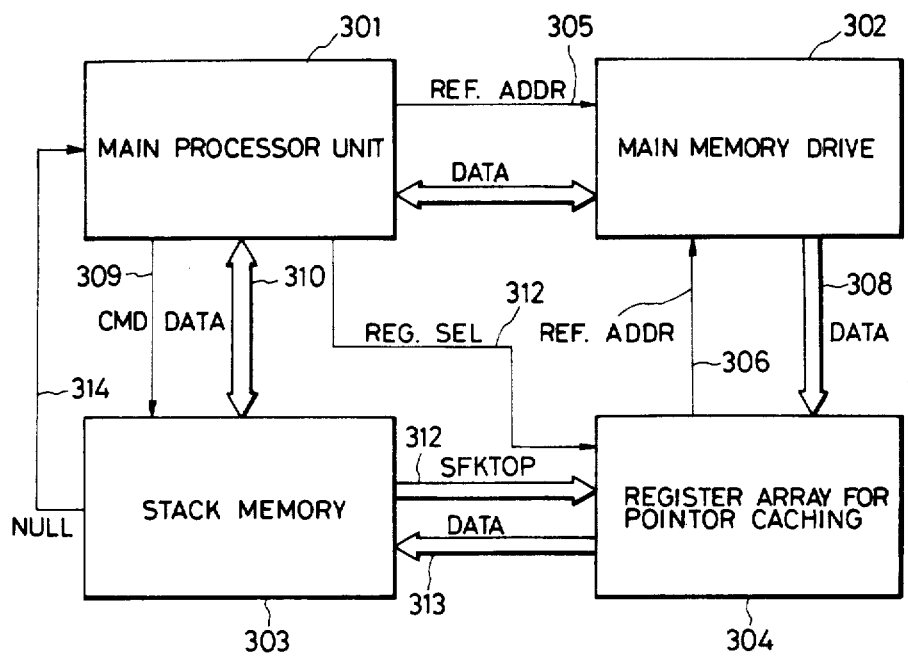
FIG. 25 is a diagram of the arrangement of hardware which has a register array for pointer caching according to the present invention.

The present embodiment is realized by a hardware arrangement as shown in FIG. 25. This apparatus is constructed of a main processor unit 301 (MPU), a main memory device 302 (MMD), a stack memory 303 (STM), and a register array for pointer caching 304 (REG). A program to be run is transformed into combinator graphs (V-codes) having variable-free product structures, and is stored in the MMD 302 in the internal form described above. The MPU 301 or the REG 304 sends the address of a node to be referred to, to the MMD 302 via a line 305 or 306, whereby the content of the MMD can be read out via a line 307 or 308. The STM 303 operates as follows, according to stack operation instructures 'push', 'pop', 'depth' and 'pushregister' which are sent from the MPU 301 via a line 309:

push . . . A value sent from the MPU 301 via a line 310 is pushed onto the stack. Next, the value of a new stack top is sent to the REG 304 via a line 312.

pop . . . The value of the stack top is sent to the MPU 301 via the line 310. Next, the stack is popped, and the value of a new stack top is sent to the REG 304 via a line 312. If the stack empties, this situation is reported to the MPU 301 via a line 314.

pushregister . . . A value sent from the REG 304 via a line 313 is pushed onto the stack. Next, the value of the new stack top is sent to the REG 304 via the line 312.

depth . . . The depth of the stack at that time is sent to the MPU 301 via the line 310. The REG 304 has a large number of registers which are in one-to-one correspondnece with integers from 1 to n.

The REG 304 examines the respective source fields of the node of a V-graph which is denoted by the value sent from the STM 303 via the line 312. In a case where the source field is a pointer value (the address of a sub node), the REG sends the address to the MMD 302 via the line 306, reads the content via the line 308 and stores the value into the register of No. corresponding to the source field. In a case where the source field is any other than the pointer value, the REG puts the value thereof into the register of corresponding No. Next, the REG sends the content of the register of register No. equal to a value delivered from the MPU 301 via a line 311, to the STM 303 via the line 313.

The MPU 301 executes the reduction steps explained with reference to FIG. 23, in accordance with microinstructions. On this occasion, the STM 303 is used for the stacks for the reductions. The push and pop of the reduction stacks are effected by sending the instructions of push, pop etc. to the STM 303 via the line 309. Especially when the sub node of the stack top is to be pushed, the pushregister instruction is sent to the STM 303 via the line 309 instead of the push instruction, while at the same time the index of the sub node (No. of the sub node) is sent to the REG 304 via the line 311, whereby a value cached by the REG 304 beforehand can be pushed, and high-speed processing becomes possible. The V-graphs to be reduced are stored in the MMD 302, so that when the value of the V-graph has become necessary in the MPU 301 in the course of the reduction, the address of the node is sent to the MMD 302 via the line 305 so as to read out the value via the line 307. Besides, when it is desired to know the depth of the stack as at the reduction step 289 by way of example, the depth instruction is sent to the STM 303 via the line 309, and the depth fo the stack can be known via the line 310.

Figure 26:
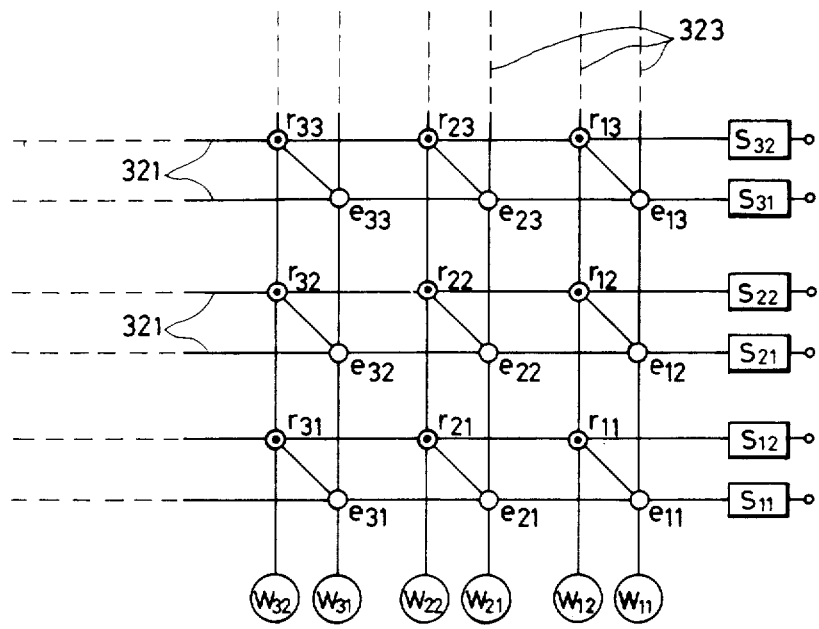
FIG. 26 is a block diagram showing the arrangement of a memory device which is especially suited to the present invention.

The above MMD 302 is of very high efficiency when it is a memory device with which, as shown in FIG. 26, one set is written and a plurality of sets (two sets in the figure) can be simultaneously read out.

Referring to the figure, read amplifiers $S_{11}$, $S_{12}$, . . . $S_{32}$ . . . are connected to data lines 321, and drive circuits $W_{11}$, $W_{12}$, . . . $W_{32}$ . . . to word lines 323. Read-only gate elements $\gamma_{11}$ . . . $\gamma_{33}$ . . . are respectively connected to memory elements $e_{11}$ . . . $e_{33}$ . . . .

With this memory device, data are written into the elements $e_{11}$ . . . $e_{33}$ . . . in the write mode, and data can be read out from the elements $\gamma_{11}$ . . . $\gamma_{33}$ . . . in parallel with the elements $e_{11}$ . . . $e_{33}$ . . . in the read mode. In general, in case of reading out a plurality of sets, that number of $\gamma_{nm}$ may be connected.

Owing to the hardware arrangement which has the pointer caching register array explained above, processes corresponding to the reduction steps 282 and 288 have greater speed.

When the REG 304 and the STM 303 are applied, improved speed can also be attained by pipeline control.

According to the second embodiment of the present invention, functional or applicative programming languages suited to future parallel processing machines can be efficiently processed by von Neumann type machines which are extensively available at present. This is effective to increase fields where, unlike procedural languages presently forming the mainstream, the functional or applicative programming languages capable of readily developing programs of higher productivity and reliability can be exploited.

What is claimed is:

1. A data processing method in an information processing system having a processor means comprising the steps of:
   transforming a program into an applicative graph which includes tuples, functions and variables;
   abstracting said applicative graph to transform it into a combinator graph;
   assigning the program in the combinator graph to a plurality of process units; and
   executing an assigned program through reductions.

2. A data processing method according to claim 1, wherein said program is a functional program, and said combinator graph contains tuple structures and no variable.

3. A data processing apparatus comprising means to transform a program into an applicative graph which includes tuples, functions and variables and to transform said applicative graph into a combinator graph, connected to means to assign the program in the combinator graph to a plurality of processors provided beforehand, and means connected to said assign means to execute a program assigned by said assign means through reductions.

4. A data processing method in an information processing system having a processor means comprising the steps of:
   transforming a program into an applicative graph which includes products, functions, variables, constants and appliers;
   subjecting said applicative graph to abstraction thereby to transform it into a combinator graph having a product structure and containing no variable; and
   executing the program in the combinator graph having the product structure, through reductions.

5. A data processing method according to claim 4, wherein said step of executing the program through reductions is carried out by pointer caching registers.

6. A data processing method according to claim 5, wherein pointer caching includes the step of pipeline control.

7. A data processing method according to claim 1, including the further step of storing the program in the combinator graph in a random access memory for simultaneously reading out a plurality of sets and subjecting it to the reductions.

8. A data processing method in an information processing system having processor means and a memory means and comprising the steps of:
   abstracting by said processor means a program in said memory means to transform it into a combinator graph which has a product structure; and
   executing said combinator graph through reductions.

9. A data processing method according to claim 8, wherein said program is a functional program, and said combinator graph has a product structure and containing no variable.

10. A data processing method according to claim 8, wherein said processor means has a plurality of processing units and said step of executing further includes the step of assigning said combinator graph into said processing units prior to said executing.

11. A data processor method according to claim 8, wherein said method includes the further step of decomposing a program into at least product and functions prior to said abstracting.

12. A data processing method according to claim 8, wherein said program is described in a functional or applicative programming language.

13. A data processing method according to claim 8, wherein said method includes the step of transforming the program into an applicative graph which includes products, functions variables, constants and appliers, prior to transforming said program into a combinator graph.

14. A data processing method according to claim 8, wherein said reductions are carried out by the further step of operating pointer caching registers.

15. A data processing method according to claim 14, wherein said step of pointer caching is performed by the step of pipeline control.

16. A data processing method according to claim 8, including the further step of storing said program, having a combinator graph, in a random access memory for simultaneously reading out a plurality of sets and is subjected to said reductions.

17. A data processing apparatus comprising:
   transforming means to transform a program by abstracting into a combinator graph which has a product structure, and means to execute said combinator graph through reductions.

18. A data processing apparatus according to claim 17, wherein said means to execute further includes means to assign the program in the combinator graph to a plurality of processor, prior to executing said combinator graph through reductions.

19. A data processing apparatus according to claim 17, wherein said program is described in a functional or applicative programming language, and further includes means to transform said program into an applicative graph which includes products, functions, variables, constants and appliers prior to transforming said program into a combinator graph.

* * * * *